United States Patent
Röhle et al.

(10) Patent No.: US 8,775,852 B2
(45) Date of Patent: Jul. 8, 2014

(54) METHOD FOR SENSING INPUT SIGNAL CHANGES

(75) Inventors: Holger Röhle, Burkhardtsdorf (DE); Matthias Simon, Flöha (DE)

(73) Assignee: Siemens Aktiengesellschaft, Munich (DE)

( * ) Notice: Subject to any disclaimer, the term of this patent is extended or adjusted under 35 U.S.C. 154(b) by 173 days.

(21) Appl. No.: 13/303,301

(22) Filed: Nov. 23, 2011

(65) Prior Publication Data
US 2012/0131373 A1    May 24, 2012

(30) Foreign Application Priority Data
Nov. 23, 2010    (EP) .................................... 10192213

(51) Int. Cl.
G06F 1/12      (2006.01)
G06F 13/42     (2006.01)
H04L 5/00      (2006.01)
H04L 7/00      (2006.01)

(52) U.S. Cl.
USPC ........................................................... 713/400

(58) Field of Classification Search
USPC ........................................................... 713/400
See application file for complete search history.

(56) References Cited

U.S. PATENT DOCUMENTS

| 5,600,576 A * | 2/1997 | Broadwater et al. ........... 702/187 |
| 6,584,163 B1 * | 6/2003 | Myers et al. .................... 375/360 |
| 6,845,416 B1 * | 1/2005 | Chasmawala et al. ......... 710/107 |
| 7,028,204 B2 * | 4/2006 | Jammes et al. ................ 713/400 |
| 7,126,407 B2 * | 10/2006 | Furtner ........................... 327/298 |
| 7,325,152 B2 * | 1/2008 | Wallner et al. ................. 713/401 |
| 7,573,914 B2 * | 8/2009 | Ilnicki et al. ................... 370/519 |
| 7,657,333 B2 * | 2/2010 | Bradford et al. ................. 700/51 |
| 7,805,280 B2 * | 9/2010 | Maier et al. .................... 702/187 |
| 8,065,052 B2 * | 11/2011 | Fredriksson et al. ........... 701/36 |
| 2003/0117899 A1 * | 6/2003 | Eidson ............................ 368/46 |
| 2004/0135601 A1 * | 7/2004 | Aman ............................. 327/116 |

(Continued)

FOREIGN PATENT DOCUMENTS

| CN | 101273559 B | * 11/2011 | .............. H04B 17/00 |
| CN | 102413055 A | * 4/2012 | .............. H04L 12/56 |

(Continued)

OTHER PUBLICATIONS

Hanisch, H.-M; Thieme, J.; Lautenbach, K.; Simon, C., "Timestamp nets in technical applications," Systems, Man, and Cybernetics, 1998. 1998 IEEE International Conference on , vol. 1, pp. 119,124, Oct. 11-14, 1998.*

(Continued)

Primary Examiner — Faisal M Zaman
(74) Attorney, Agent, or Firm — Cozen O'Connor

(57) ABSTRACT

A method for sensing input signal changes at an input of an input/output module operated in an automation system in which a signal is sampled by an input/output module. A change event and a timestamp associated with the change event are generated when a change in the sampled signal occurs and a value pair comprising the change event and the timestamp is stored in a higher-ranking automation component to the input/output module. The input/output module and the higher-ranking automation component are operated clock-synchronously with respect to one another by a clock pulse, and the timestamp is calculated centrally on the higher-ranking automation component based on the clock-synchronous operation.

6 Claims, 3 Drawing Sheets

(56) References Cited

U.S. PATENT DOCUMENTS

| | | | |
|---|---|---|---|
| 2004/0199802 A1* | 10/2004 | Lin | 713/400 |
| 2005/0149631 A1* | 7/2005 | Decker | 709/230 |
| 2005/0198420 A1* | 9/2005 | Shingaki | 710/113 |
| 2006/0047450 A1* | 3/2006 | Tabatabaei et al. | 702/69 |
| 2007/0047686 A1* | 3/2007 | Aoki et al. | 375/374 |
| 2008/0112440 A1* | 5/2008 | Bedekar et al. | 370/519 |
| 2008/0215208 A1* | 9/2008 | Carlson | 701/35 |
| 2009/0049345 A1* | 2/2009 | Mock et al. | 714/57 |
| 2009/0180783 A1* | 7/2009 | Huang et al. | 398/155 |
| 2010/0292825 A1* | 11/2010 | Taylor et al. | 700/108 |
| 2011/0145203 A1* | 6/2011 | Lobuono | 707/668 |

FOREIGN PATENT DOCUMENTS

| | | |
|---|---|---|
| DE | 103 21 652 | 12/2004 |
| DE | 10 2004 050 386 | 5/2006 |
| DE | 10 2006 010 748 | 9/2007 |
| EP | 1 184 755 | 3/2002 |
| EP | 1 219 520 | 7/2002 |
| EP | 1 981 243 | 10/2008 |
| EP | 2 085 841 | 8/2009 |
| MY | 128994 A * | 3/2007 ....... H04N 21/23608 |

OTHER PUBLICATIONS

Novak, T.; Sevcik, B., "Network time synchronization in a safe automation network," Factory Communication Systems, 2008. WFCS 2008. IEEE International Workshop on , pp. 305,313, May 21-23, 2008.*

Simon, C., "Verification in factory and office automation," Systems, Man and Cybernetics, 2002 IEEE International Conference on , vol. 5, pp. 6, Oct. 6-9, 2002.*

Ferrari, P.; Flammini, A.; Marioli, D.; Taroni, A., "A new distributed instrument for real time ethernet networks: experimental tests and characterization," Emerging Technologies and Factory Automation, 2007. ETFA. IEEE Conference on , pp. 524,531, Sep. 25-28, 2007.*

* cited by examiner

METHOD FOR SENSING INPUT SIGNAL CHANGES

BACKGROUND OF THE INVENTION

1. Field of the Invention

The invention relates to signal sensing and, more particularly, to a method for sensing input signal changes at an input of an input/output module operated in an automation system, where a signal is sampled by the input/output module, a change event and a timestamp associated with the change event is generated when a change in the sampled signal occurs, and a value pair comprising the change event and the timestamp is stored in an automation component having a higher-ranking than the input/output module.

2. Description of the Related Art

In automation systems, i.e., in decentralized stations using fieldbus/PROFIBUS-DP or PROFINET, input/output modules are connected preferably by an interface module. It is through input/output modules that signal changes from digital or analog peripherals are sensed, analyzed and provided with a time of day. The time of day is configured as a timestamp. Making use of the timestamping of signal changes is particularly important to be able to analyze a chronological sequence of events (SOE) at a later stage. An example of such an input signal change is a change in a binary input signal, or a state change or the like. Within the meaning of the present invention, an input signal change is also to be understood as meaning that a limit value of an analog signal has been exceeded.

DE 10 2006 010 748 A1 discloses a method for recording input signal changes. On the other hand, it is known in automation devices having decentralized peripherals that are connected to the interface module to implement a function that analyzes a signal change from, for example, a digital peripheral and provides said signal change with a timestamp accordingly. This means, however, that the time instant recorded in the timestamp is the time of day of the clock in the interface module at the moment of the transfer of the user data from the peripheral module, preferably the input/output module, and as a consequence is different from the time instant of the actual recording of the signal on the peripheral module or, as the case may be, the input/output module. With the method described in DE 10 2006 010 748 A1, it is disadvantageous that in order to record the input signal change on the input/output modules each input/output module requires an implementation or hardware for a high-precision clock. On the other hand, it is a disadvantage of the known methods having the decentralized peripherals that the timestamp is not determined with a sufficient degree of precision.

SUMMARY OF THE INVENTION

It is therefore an object of the invention to provide a method for sensing input signal changes in which there is no initial requirement for additional, cost-intensive hardware and, subsequently, the precision of the input signal change in respect of the timestamp is increased.

This and other objects and advantages are achieved in accordance with the invention by providing a method in which the input/output module and a higher-ranking automation component are operated clock-synchronously with respect to one another by a clock pulse, where the timestamp is calculated centrally on the higher-ranking automation component based on the clock-synchronous operation in response to a change event when a change in a monitored signal occurs. Using the clock-synchronous processing of inputs and outputs, it is possible, by the use of synchronized sequences, to increase the degree of precision for the sensing of peripheral signal changes. Instead of a time-of-day synchronization on each individual input/output module, a clock-synchronous data transmission is chosen for the automation system. In accordance with the method of the invention, all cycles in the system run in synchronism with one another and equidistantly from one another, where each data transmission is preferably of equal duration. This enables the time instant at which a value changed on the input/output module to be determined. A higher-ranking automation component can stamp the changed data itself, because it can calculate the time instant at which the change occurred.

Preferably, the timestamp is generated as the result of an addition of an instantaneous time at the time instant of the clock pulse and a multiple of a sampling interval in the input/output module.

In this case, the signal is sampled in the input/output module at a frequency resulting from the division of the clock period by the sampling interval. It is to be understood that the clock period is the time interval between two synchronization clock pulses.

In an embodiment, a number of sampled values corresponding to the frequency is buffered in the input/output module and transmitted to the higher-ranking automation component, where a check is performed in the higher-ranking automation component based on a series of values to determine at which value a signal change occurred, and the position of the value within the series yields the multiple used for calculating the timestamp.

In another embodiment, a number of sampled values corresponding to the frequency is buffered in the input/output module and a check is performed in the input/output module based on the series of values to determine at which value a signal change occurred, where the position of the value within the series yields the multiple used for calculating the timestamp and the multiple is transmitted to the higher-ranking automation component.

In further embodiment, an edge detector is operated in the input/output module to detect when a signal change occurs and a counter is incremented in the input/output module for each value sampled, where a count of the counter yields the multiple used for calculating the timestamp when an edge is detected by the edge detector and the multiple is transmitted to the higher-ranking automation component.

In order to optimize the degree of precision further, the edge detection is performed in an analog manner in the input/output module, as a result of which a smaller sampling interval is chosen and the precision of the timestamp calculation is improved. In this case, the edge detector is built using discrete components.

A clock that provides the instantaneous time is operated in the higher-ranking automation component for all the aforementioned embodiment variants, where the clock is synchronized with other automation components in the automation system.

It is advantageous if the higher-ranking automation component is operated as an interface module and the input/output module sends the acquired values to the interface module over a peripheral bus, where the interface module is in turn operated on a fieldbus connected to an automation device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further embodiment features and advantages are explained with reference to the drawing, in which.

DETAILED DESCRIPTION OF THE PREFERRED EMBODIMENTS

Figure 1:
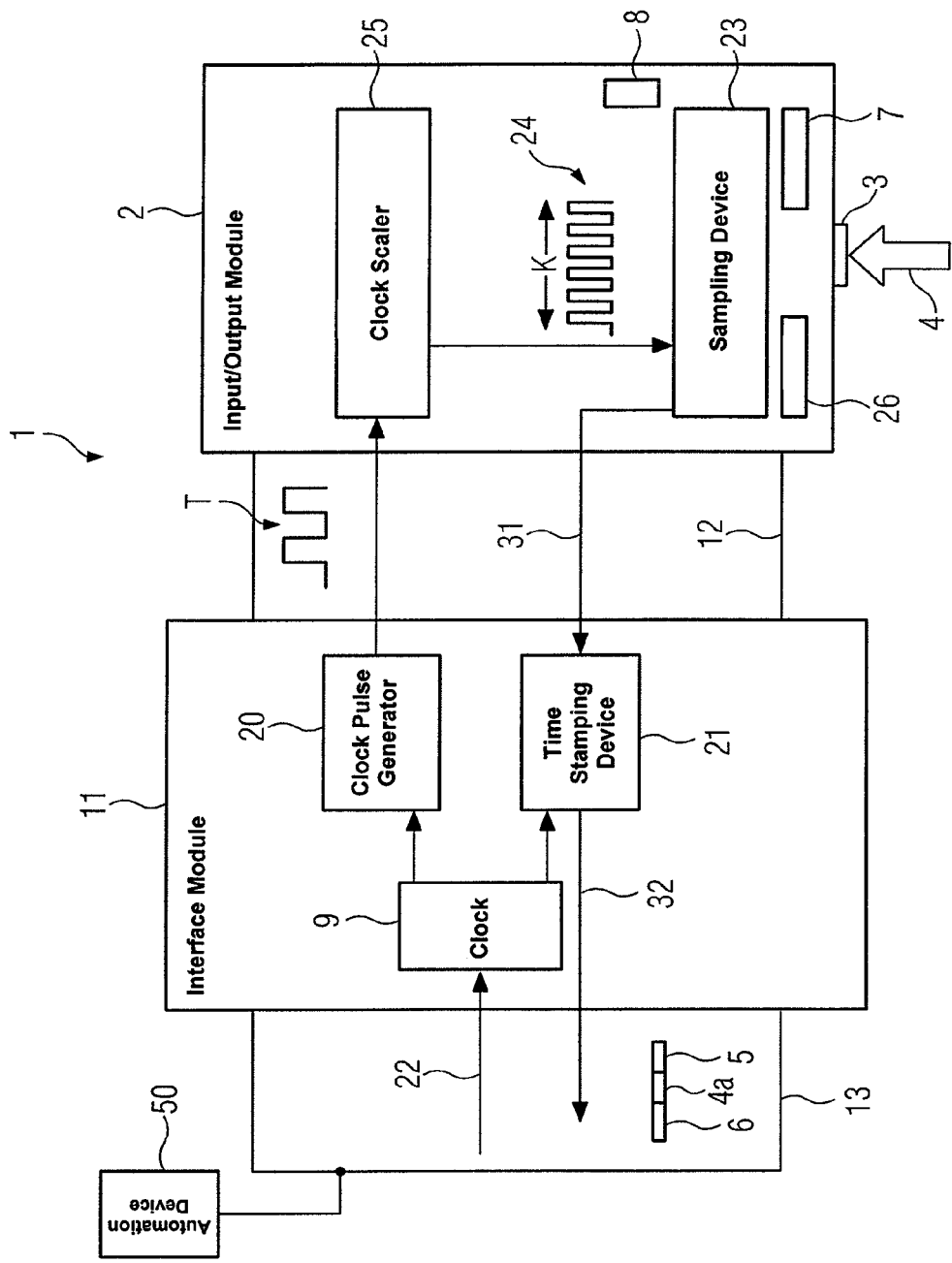
FIG. 1 shows an input/output module in an automation system network in accordance with the invention.

FIG. 1 shows an automation system 1 comprising an automation device 50, a fieldbus 13, an interface module 11, a peripheral bus 12 and an input/output module 2 having an input 3 for signals 4. Such an automation system 1 may be a programmable control system, a programmable logic controller having decentralized peripherals connected through the fieldbus 13 or else a personal computer, in particular for process automation.

A sensor that leads into an industrial process, for example, is connected across the input 3 of the input/output module 2. A method for sensing input signal changes at the input 3 of the input/output module 2 is applied so that it can be established subsequently in the automation device 50 or in an in turn higher-ranking control system at precisely what instant of time the signal of the sensor changed, for example, from "0" to "1", i.e., from "OFF" to "ON" or from "door closed" to "door open". In this scenario, the signal 4 across the input 3 is sampled in the input/output module 2 with the aid of a sampling device 23, where a sampling in the sampling device 23 is performed using a conventional oversampling method in a manner known to the person skilled in the art. This means that inside the input/output module 2 there takes place an oversampling of the signal 4 referred to as a synchronous clock pulse T prevailing in the automation system 1. A clock scaler 25 in the input/output module 2 is configured to receive the synchronous clock pulse T and generate a downscaled clock pulse 24 from the synchronous clock pulse T by division. For example, the clock pulse T has a clock period of 100 µs and consequently the downscaled clock pulse 24 has a sampling interval I of 10 µs.

Time-of-day synchronization telegrams 22 are sent to all the automation components in the automation system 1 to establish the clock synchronism for the clock pulse T in the automation system 1. The time-of-day synchronization telegram 22, which reaches the interface module 11 over the fieldbus 13, is received by a clock 9 comprising a high-precision clock that is synchronized over the fieldbus 13. The synchronized time of day in the clock 9 is used in the interface module 11 for driving a clock pulse generator 20 that generates the clock pulse T. The clock pulse generator 20 is connected to the clock scaler 25 of the input/output module 2 over the peripheral bus 12.

If a change in the input signal 4 is detected, a change event 5 is transmitted to the interface module 11 over the peripheral bus 12. As a result of the transmission, the change event 5 arrives at a timestamping device 21. The input/output module 2 and the interface module 11 are operated clock-synchronously with respect to one another. As a result, a timestamp 6 can be calculated centrally on the interface module 11 due to the clock-synchronous operation. A frequency K at which sampling is performed is used for the calculation. In this case, the frequency K results from the division of the clock period of the clock pulse T to produce the sampling interval I.

In an embodiment, a number of sampled values corresponding to the frequency K is buffered in the input/output module 2 and transmitted to the interface module 11 over the peripheral bus 12. Here, the timestamping device 21 in the interface module 11 is configured such that a check is performed based on a series of values to determine at which value the signal change occurred, where the position of the value within the series yields the multiple used for calculating the timestamp. Also generated in the timestamping device 21 is a telegram that contains the timestamp 6, the current value of the signal 4a and the change event 5. This telegram can be sent over the fieldbus 13.

Figure 2:
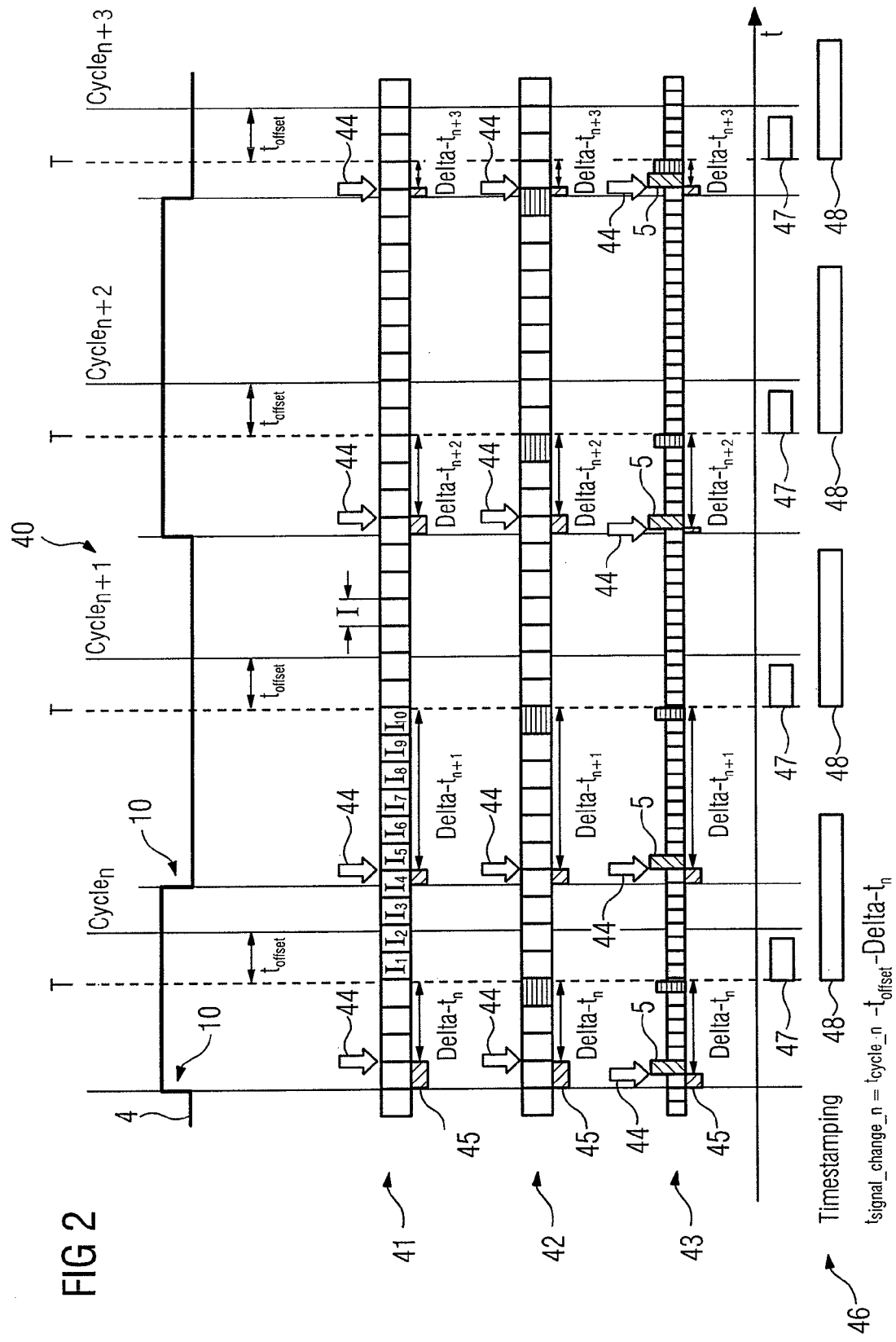
FIG. 2 is a flow diagram having three different variants for sensing an input signal change in accordance with the invention.

Further embodiments indicating how the timestamping device 21 or the input/output module 2 can be implemented or programmed are illustrated in FIG. 2.

FIG. 2 is a flow diagram 40 that shows a signal waveform of the signal 4. As the input signal changes, in this instance, the signal waveform has edges 10 that alternately rise or fall. The clock pulse T is shown as a synchronization pulse represented by a vertical dashed line through the diagram. The distance between two synchronization pulses, i.e., between, each of the two vertical dashed lines, is 100 µs. The diagram shows a cycle N, a cycle N+1 and a cycle N+2, as well as a cycle N+3.

In an embodiment for sensing the input signal changes 41, the clock period in the cycle N is examined more closely. As a result of the downscaled clock pulse 24, i.e., the oversampling in the input/output module 2, a plurality of 10 µs slices are produced in the clock period of 100 µs, a first 10 µs interval $I_1$ up to a tenth 10 µs interval $I_{10}$. Here, the timeslices of 10 µs each are numbered consecutively from 1 to 10. Referring to the superordinate clock pulse T having a clock period of 100 µs, the input/output module 2 can now detect a new value every 10 µs as and store the value in an internal buffer (oversampling). By the interface module 11 reading out the complete buffer, i.e., all 10 values, it is possible for the timestamping device 21 to determine a Delta-t owing to the granularity of the 10 µs slices and, hence, calculate the timestamp in which a signal change actually occurred. This results in a far higher degree of precision than is the case in the prior art. The sensing moment 44 at which a signal change was detected is represented in each case as a bold black arrow. Referring to the signal waveform of the signal 4 with the rising edge 10, a dashed vertical line leads downward to the embodiment 41. A signal change occurs at precisely this point due to the rising edge 10. However, this signal change was not detected until after the 10 µs slice had elapsed, resulting in a sensing error 45 and a Delta-$t_n$.

Another embodiment 42 is equally conceivable. Here, a number of sampled values corresponding to the frequency K is buffered in the input/output module 2 and a check is performed in the input/output module 2 based on the series of values to determine at which value a signal change occurred, the position of the value within the series yields the multiple used for calculating the timestamp 6 and the multiple is transmitted to the interface module 11 for the timestamping device 21.

In another embodiment 43, an edge detector 7 is operated in the input/output module 2 (see FIG. 1), where the edge detector 7 detects when a signal change occurs and increments a counter 8 for each value sampled in the input/output module 2. When an edge 10 is detected by the edge detector 7, the count of the counter 8 becomes the multiple used for calculating the timestamp 6. The multiple or count is accordingly transmitted to the interface module 11 over the peripheral bus 12 and used in the timestamping device 21 for calculating the timestamp.

In the presently contemplated embodiment 43, the edge detection represents the change event 5.

A change in the data transmission 47 occurs at the end of each cycle N. Accordingly, the bottom line of the flow diagram 40 results in a sequence 46 in the interface module.

A possible formula for a timestamp calculation would be:

$$t_{signal\_change\_n} = t_{cycle\_n} - t_{offset} - \text{Delta-}t_n$$

In this equation, $t_{cycle\_n}$ corresponds to the instantaneous time. The $t_{offset}$ could be a propagation time delay on the peripheral bus 12.

Figure 3:
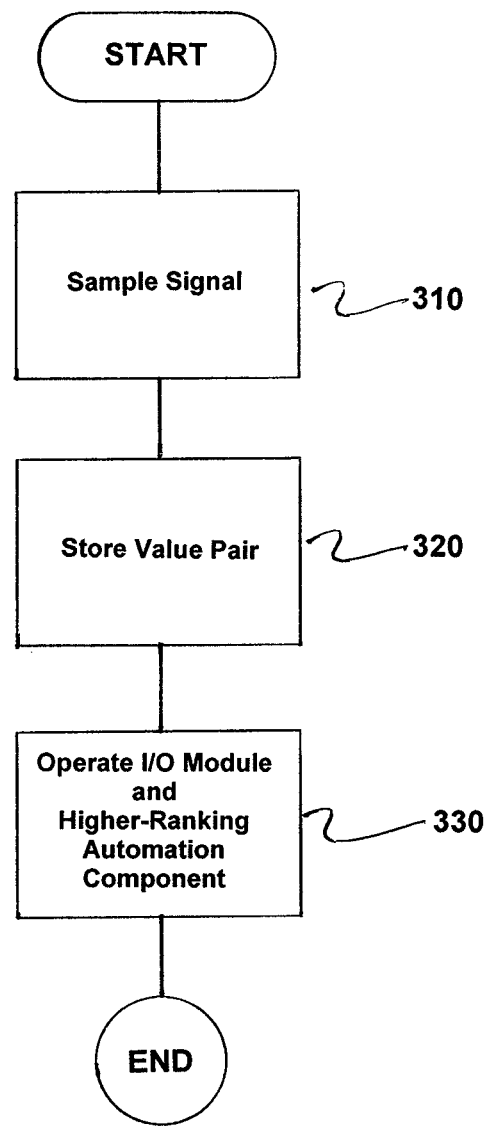
FIG. 3 is a flow chart of the method in accordance with an embodiment of the invention.

FIG. 3 is a flow chart of a method for sensing input signal changes at an input 3 of an input/output module 2 operated in an automation system 1. The method comprises sampling a signal 4 by the input/output module 2 to generate a change event 5 and a timestamp 6 associated with the change event 5 when a change in the signal occurs, as indicated in step 310.

A value pair comprising the change event 5 and the timestamp 6 is stored in an automation component having a higher-ranking than the input/output module 2, as indicted in step 320. The the input/output module 2 and the higher-ranking automation component are operated clock-synchronously with respect to one another by a clock pulse T, as indicated in step 330. Here, the timestamp 6 is calculated centrally on the higher-ranking automation component based on the clock-synchronous operation.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for sensing input signal changes at an input of an input/output module operated in an automation system, comprising:

sampling a signal by the input/output module, generating a change event and generating a timestamp associated with the change event in a higher-ranking automation component having a higher ranking than the input/output module when a change in the signal occurs;

storing a value pair comprising the change event and the timestamp in the higher-ranking automation component having the higher ranking than the input/output module;

operating an edge detector in the input/output module to detect when the signal change occurs, and operating the higher-ranking automation component clock-synchronously with respect to one another by a clock pulse, the timestamp being calculated centrally on the higher-ranking automation component based on the clock-synchronous operation; and incrementing a counter in the input/output module for each value sampled;

wherein the timestamp is generated by addition of an instantaneous time at a time instant of the clock pulse and a multiple of a sampling interval of the input/output module;

wherein the signal is sampled in the input/output module at a frequency resulting from a division of a clock period of the clock pulse by the sampling interval; and wherein a count of the counter yields a multiple used for calculating the timestamp when an edge is detected by the edge detector and said multiple is transmitted to the higher-ranking automation component.

2. The method as claimed in claim 1, further comprising:

buffering a number of sampled values corresponding to the frequency in the input/output module and transmitting the number of sampled values to the higher-ranking automation component; and performing a check in the higher-ranking automation component based on a series of values to determine a value at which the signal change occurred, wherein a position of the value at which the signal change occurred within the series yields a multiple used for calculating the timestamp.

3. The method as claimed in claim 1, further comprising:

buffering a number of sampled values corresponding to the frequency in the input/output module; and performing a check in the input/output module based on a series of values to determine a value at which the signal change occurred;

wherein a position of the value at which the signal change occurred within the series yields a multiple used for calculating the timestamp, said multiple being transmitted to the higher-ranking automation component.

4. The method as claimed in claim 1, wherein the edge detection is performed in an analog manner in the input/output module, a smaller sampling interval being chosen by the analog edge detection and a degree of precision of the timestamp calculation being improved.

5. The method as claimed in claim 1, further comprising:

operating a clock in the higher-ranking automation component to provide the instantaneous time, said clock being synchronized with other automation components in the automation system.

6. The method as claimed in claim 1, wherein the higher-ranking automation component is operated as the interface module and the input/output module sends acquired values to the interface module over a peripheral bus, the interface module in turn being operated on a fieldbus connected to an automation device.

* * * * *